United States Patent Office 3,549,305
Patented Dec. 22, 1970

3,549,305
AROMATIC POLYESTER FIBER DYED WITH DISAZO DYESTUFF
Edgar E. Renfrew and Dominic A. Zanella, Lock Haven, Pa., assignors to American Aniline Products, Inc., a corporation of Delaware
No Drawing. Filed Sept. 22, 1969, Ser. No. 860,067
Int. Cl. D06p 3/12
U.S. Cl. 8—41          6 Claims

ABSTRACT OF THE DISCLOSURE

Polyester fabric is dyed with disazo dyestuffs, made by coupling an appropriate diazotized aminoazobenzene into esterified 2,2'-(phenylimino)diethanol. The disazo dyes, when appropriately dispersed, produce dyeings on aromatic polyester fabrics with excellent substantivity and sublimation fastness and good fastness to light. They are applied to polyesters, such as polyethylene terephthalate, by carrier dyeing, pressure dyeing, and thermofixation techniques.

BACKGROUND OF THE INVENTION

Recently, considerable attention has been directed to dyes for polyesters which are prepared from appropriate diazo components and tertiary amine coupling components containing two modified hydroxyalkyl groups attached to the tertiary-aminonitrogen. These dyes have been proven to have good affinity for polyester fabrics under certain conditions, depending on the structure of the particular dye. For example, one such modification involves making the diacetoxy derivative of a tertiary-amino coupling component containing two hydroxyalkyl groups by acylation with acetic acid or acetylchloride as described in Merian, U.S. 3,178,405.

It is known that as the size of these dye molecules is increased by an increase in molecular weight, particularly through the acylation of hydroxyl groups, the effectiveness as a polyester color diminishes readily. Perhaps for this reason, disazo dyestuffs have not been outstanding as polyester colors. It is known that certain disazo orange dyes can be blended in minor proportion with monoazo blues to make blacks; for example, as Rotcop and Baumann in U.S. 3,413,075. Disazo dyes of the type used by Rotcop et al. tend to sublime more readily than the monoazo blues used in the mixture.

Disazo dyes prepared from a tertiary-amino coupling component containing esterified hydroxyalkyl groups attached to the aminonitrogen are known from McNally et al., U.S. 2,216,446. The dyes of McNally et al. are made from an aminoazobenzene having as part of its structure a CH₂X group (in which X is preferably —OH) attached to the benzene ring positioned in the middle in the final disazo structure. Although these dyes are said to be useful for coloring cellulose organic derivatives and wool, the intermediate containing the CH₂X group required for their preparation is not commercially available and is difficult to prepare.

We have discovered that certain water-insoluble disazo dyestuffs have remarkable affinity for aromatic polyester fibers and achieve a build-up on the polyester fabric proportional to the amount of dye applied. Dyeings of aromatic polyester are characterized by excellent light and sublimation properties.

SUMMARY OF THE INVENTION

In accordance with the invention, there is provided aromatic polyester fiber dyed with a dye of the formula:

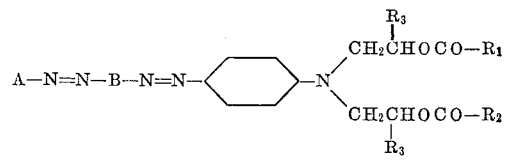

In the above formula, A is a benzene nucleus either unsubstituted or substituted with nitro, chloro, lower alkoxy, sulfamyl, lower alkylsulfamyl, di lower alkyl sulfamyl, and carbamyl. A can be substituted with one or more of the same or different groups. B is a benzene nucleus either unsubstituted or substituted with lower alkoxy or lower alkyl groups. $R_1$ and $R_2$ are lower alkyl, chloro-lower alkyl or phenyl, and $R_3$ is a hydrogen or methyl.

DETAILED DESCRIPTION

The preferred dyes used in making the dyed polyester fibers of the invention are those of the formula:

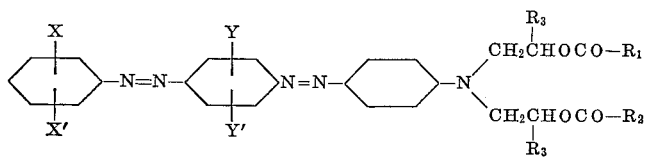

in which X and X' are hydrogen, nitro, chloro, lower alkoxy, sulfamyl, lower alkyl sulfamyl, di lower alkyl sulfamyl, or carbamyl; Y and Y' are lower alkyl, hydrogen, or lower alkoxy; and $R_1$, $R_2$ and $R_3$ have the meanings given aforesaid.

The dyestuffs are made in the conventional manner by adding a diazotized aminoazobenzene to a solution of an appropriate coupling component.

Certain aminoazobenzenes can be made by the rearrangement of diazoamino compounds (or triazenes) by well-established methods. A general way to make aminoazobenzenes is to couple a diazotized aromatic amine into the same or a different primary aromatic amine with an available coupling position. In certain cases, it is desirable to promote the coupling and to protect the primary amine by a group which can be removed by hydrolysis after the coupling. The technique often used is the formation of the anilinomethane-sulfonic acid.

The aminoazobenzene intermediate is diazotized in the usual way by heating it in a concentrated aqueous solution of a strong mineral acid, such as hydrochloric acid, cooling the resulting solution to a temperature of 0–10° C. and adding thereto a quantity of sodium nitrite slightly in excess of the stoichiometric requirement. An alternate method of diazotization involves dissolving sodium nitrite in concentrated sulfuric acid, heating to a temperature of about 60–70° C., cooling the resulting solution to 0–10° C. and adding thereto the aminoazobenzene.

The coupling component is made from a 2,2'-phenyliminodiethanol by esterification with an aliphatic acylating agent; e.g. acetyl chloride, butyryl chloride, propionyl chloride, chloroacetyl chloride, or anhydride thereof, or an aromatic acylating agent; e.g. benzoyl chloride, or an acid derivative thereof such as benzoic anhydride. Mixed esterifying agents can be used as described in the copending application of Dominic A. Zanella, Ser. No. 673,956, filed Oct. 9, 1967.

The disazo dyestuff used in the invention is made by coupling the diazotized aminoazobenzene with the esterified 2,2′-phenyliminodiethanol by adding the diazonium salt to a cold aqueous acid solution of the coupler. A buffering agent such as sodium acetate to reduce the acidity to a pH of 5 to 7 is added and the mixture is allowed to react for 8 to 24 hours at room temperature and is thereafter filtered and washed acid free. The desired dyestuff is thus obtained in the form of a wet cake.

The dyestuffs are applied to aromatic polyester fibers, such as polyethylene terephthalate, in the form of a dispersed color powder or paste, which is obtained by wet milling in a conventional apparatus such as a ball mill, the dye, a dispersant such as sodium lignin sulfonate, and a wetting agent. The dispersed cake or paste thus obtained can be dried, if desired at 70–80° C. and thereafter micropulverized. The ratio of active dyestuff base to dispersing agent in the powder or paste can vary between 1:4 to 4:1.

The dispersed powder, when added to water, with or without auxiliary agents, forms a near colloidal aqueous dispersion from which the aromatic polyester fiber or goods can be dyed in the conventional manner to give a fiber containing from 0.01–2 percent dyestuff. Detailed dyeing procedures and evaluation of the dyed product according to standard test methods are described hereinafter in Examples 2, 3 and 4.

Our invention is further illustrated by the following examples:

EXAMPLE I

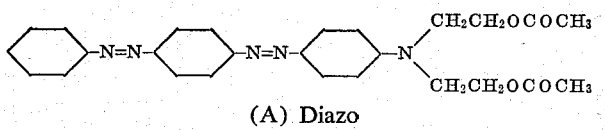

(A) Diazo

A 2000 ml. beaker was charged with 300 ml. water, 118 g. 32% hydrochloric acid and 46.7 g. 4-aminoazobenzene hydrochloride (0.2 mole). The mixture was heated to 75° C. and held at this temperature for 1 hour. It was then iced to 0° C. and a solution of 30 ml. water and 14.0 g. sodium nitrite was added to the mixture during a period of 1 hour. The diazotization mass was stirred for 1 hour at 0–5° C. and for 2 hours at 5–10° C. after the addition of the sodium nitrite solution.

The excess nitrous acid was destroyed with sulfamic acid.

Ten g. filteraid was added and the diazo was clarified.

(B) Coupler

A 500 ml. 3-neck flask was charged with 50.0 g. glacial acetic acid and 36.8 g. 2,2′-phenyliminodiethanol (0.22 mole). The charge was heated to 95° C. and at 95–100° C. 45.0 g. acetic anhydride were dropwise added to it. After the addition of the acetic anhydride, the reaction mass was held at 98–100° C. for 1 hour and then poured into 500 g. ice and 500 ml. water and 25.0 g. hydrochloric acid (32% concentration).

(C) Coupling

The coupler solution was iced to 0° C. and the diazo solution added to it during a period of 1 hour at 0–5° C. After the addition of the diazo, a solution of 500 ml. water and 101.0 g. anhydrous sodium acetate was added to the coupling of 0–5° C. during a period of 1 hour. The reaction mass was slightly acid to Congo red papers. The combination was stirred 16 hours, filtered and the filter cake washed with 1000 ml. cold water. Yield: 295.0 g. wet cake at 28.8% dry test=84.95 g. 100%.

(D) Dispersion

A ball mill was charged with 250.0 g. wet cake 72 g. 100% content, 60.0 g. sodium ligninsulfonate and 50.0 g. water. The milling operation was continued until a satisfactory dispersion had been reached as shown by a filter test. Yield: 360.0 g. 20% paste.

EXAMPLE II

A dyebath was prepared by adding 30 g. of a phenolic dye carrier to 300 g. water and 3 g. sodium phosphate. A 10 g. swatch of spun Type 54 Dacron (a comercially available polyester yarn) was worked in the bath for 10 minutes at 120° F. Then was added 1 g. of the 20% dyestuff paste as prepared in Example I. (Thus 0.2 g. 100% dye, 2% of the weight of the polyester yarn.) The temperature of the bath was raised to 205° F. over twenty minutes, during which time the switch was moved in the bath. Dyeing was continued for one hour at 205° F. after which the swatch was removed from the bath, rinsed, and dried.

The polyester was colored a very bright orange. The depth of dyeings could be controlled by varying the amount of dye added to the bath; the depth reached was proportional to the amount used within practical limits.

Tests were run on the dyeings by the methods established by the American Association of Textile Chemists and Colorists, P.O. Box 12215, Research Triangle Park, N.C., 27709, and published in the Technical Manual of the AATCC, 1968 Edition, Part B. Results of each test, and the page on which it is described are: Light fastness (B–84) rating: 3; sublimation (B–74) rating: 4.

EXAMPLE III

A dyebath was prepared by adding 8 grams of a phenolic dye carrier and 4 grams sodium phosphate to 400 g. water in a pressure vessel of construction such that circulation of the dyebath can be maintained. A ten g. swatch of Type 54 Dacron (a commercially available polyester fabric) was treated in the circulating bath for ten minutes.

A sample of 0.5 g. of the dye paste prepared in Example I was added to the bath. The vessel was then closed and the temperature was raised over 45 minutes to 250° F. The bath was in turbulent contact with the fabric throughout one hour at 250° F. the vessel was cooled, opened and the swatch removed. It was washed, rinsed and dried.

Suitable pieces of the swatch were tested for lightfastness, washfastness and fastness to sublimation by the standard methods of the AATCC designated in Example II.

EXAMPLE IV

A pad liquor containing 60 g. per liter of the disperse dye of Example I and 1.2 g. of Keltex S (a commercially available sodium alginate thickening agent) per liter was prepared. This liquor was heated to 140° F. and padded by a one-dip, one-nip squeeze (40 p.s.i.) method on spun Type 54 Dacron fabric. The padded fabric was then dried at 180–200° F. The dried goods were heated in an oven at 420° F. for 1½ minutes, after which it was rinsed in hot running water, soaped hot, rinsed and dried.

Suitable pieces were tested for various fastness by AATCC methods described in the Technical Manual of the American Association of Textile Chemists and Colorists, 1968 Edition, Part B.

EXAMPLE V

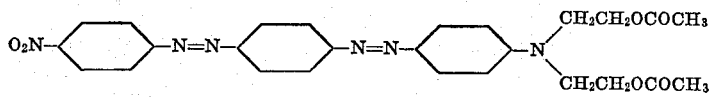

(A) Diazo

Charged to a 3000 ml. beaker 48.4 g. 100% 4-amino-4′-nitroazobenzene (0.2 mole) 345.0 paste 14% dry test, and 140 g. hydrochloric acid 32%. The slurry was heated to 75° C. The mixture was then cooled by adding ice to 0–5° C. During 1 hour, there was dropped in a solution of 14.0 g. sodium nitrite in 50 ml. water. The diazotization mass was stirred 1 hour 0–5° C.; 2 hours 5–10° C.; and 1 hour 10–15° C. Then the excess nitrous acid was removed with sulfamic acid. The diazo was neutralized to silght violet on Congo red with 67.5 g. sodium acetate. Added were 10 g. filter aid and clarified the diazo. The solution was preserved cold.

(B) Coupler

There was charged to a 500 ml. 3-neck flask 50.0 g. glacial acetic acid and 6.2 g. 2,2′-phenyliminodiethanol (0.2 mole). The mixture was heated to 95° C. At 95–100° C. there was dropped in 42.0 g. acetic anhydride. After the addition, the mixture was stirred 1 hour at 95–100° C. It was then poured into a mixture of 400 g. ice and 400 ml. water containing 25.0 g. hydrochloric acid (32% concentration).

(C) Coupling

The coupler solution was iced to 0° C. At 0–5° C. in 1 hour, the clarified diazo solution was added. Then, during 1 hour at 0–5° C. there was added a solution of 150 ml. of water and 33.0 g. sodium acetate. The mass was allowed to stir 16 hours, after which it was filtered and washed acid free with cold water. Yield: 700.0 g. cake at 10% dry test=70.0 g. 100%.

(D) Dispersion

A ball mill was charged with 450.0 g. wet cake 45.0 g. 100%, 45.0 g. sodium lignin sulfonate, and 5.0 cc. water. This total amount (500 g.) is thus 9% dye. The mass was milled until the product was satisfactorily dispersed. When dyed according to the method previously described in Example II, the following results were obtained:

Carrier:
  Shade: Red-brown
  Light: 3–4
  Sublimation: 4–5 at 350° F.; 4–5 at 400° F.

The dye was especially suitable for application by thermofixation methods as described in Example IV.

Shade: Very reddish brown
Cotton Reserve: 2–3
Light: 3

EXAMPLE VI

In the manner of Example V, a dye of structure:

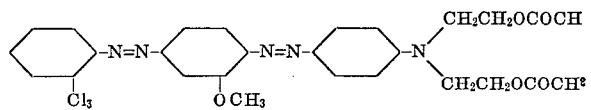

was prepared.

4-amino-3-methoxy-2′-chloroazobenzene was diazotized and coupled with 2,2′-phenyliminobis (ethyl acetate). Polyester dyed with the dye by conventional methods such as carrier, pressure or thermofixation, was scarlet, and showed excellent performance in standard AATCC tests.

EXAMPLE VII

In the manner of Example V, a dye of structure:

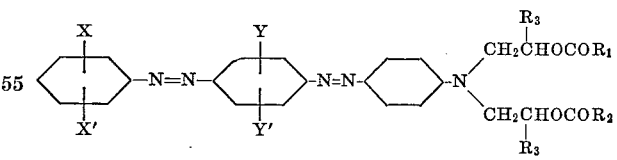

was prepared. N,N-dimethyl-4-(p-aminobenzeneazo) benzenesulfonamide was diazotized and coupled with 2,2′-phenyliminobis (ethyl acetate). Polyester dyed with the dye by carrier, pressure or thermofixation methods was very resistant to color change or loss in tests as defined in the AATCC Technical Manual, 1968 Edition, Part B. The hue was scarlet. Dyeings of similar hue and properties were obtained from disazo dyes made from 4(p-amino-benzeneazo) benzene sulfonamide and N-methyl-4-(p-aminobenzeneazo) benzenesulfonamide, together with the same coupler.

EXAMPLE VIII

A dye of the structure:

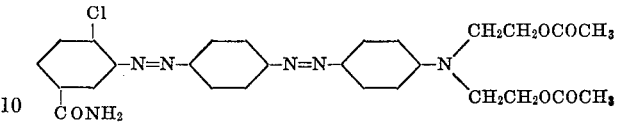

was made by the method of Example I. The intermediate, 3-(p-aminophenylazo)-4-chlorobenzamide, was prepared by diazotizing 3-amino - 4 - chlorobenzamide, coupling it with anilinemethanesulfonic acid, and hydrolyzing the product to yield 3-(p-aminophenylazo) - 4 - chlorobenzamide.

Polyester dyed with the disazo dye by a carrier, a pressure or a thermofixation method was colored reddish-orange. Fastness tests run by AATCC standard methods showed it to have excellent properties. Sublimation fastness was particularly outstanding.

EXAMPLE IX

A dye of structure:

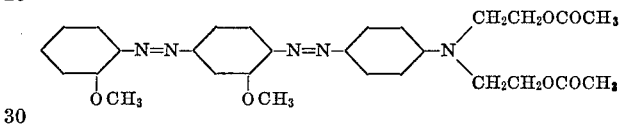

was prepared by the method of Example I, using 4-amino-2′,3-dimethoxyazobenzene as the diazotizable base. Polyester fabric dyed with it by carrier, pressure or thermofixation methods was bluish-red in hue. Color durability was excellent when tested by AATCC standard methods.

EXAMPLE X 4-amino-2-methoxy-5-methylazobenzene (prepared by the coupling of diazotized aniline into "cresidine") was diazotized and coupled with a mixed coupler prepared by esterifying 2,2′-phenyliminodiethanol with chloroacetyl-chloride and benzoyl chloride. The disazo material, when suitably dispersed by the method described in Example I, and dyed on aromatic polyester fibers by the methods described in Examples II, III, and IV yielded dyeings of reddish-orange hue. The dyeings showed good properties in the standard AATCC tests. Resistance to sublimation was notably good.

What is claimed is:

1. A dyed product consisting of aromatic polyester fiber dyed with a compound of the formula:

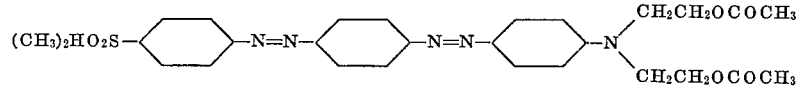

wherein X and X′ are members selected from the group consisting of hydrogen, nitro, chloro, lower alkoxy, sulfamyl, lower alkyl sulfamyl, di lower alkylsulfamyl and carbamyl; Y and Y′ are members selected from the group consisting of hydrogen, lower alkyl and lower alkoxy; $R_1$ $$\begin{array}{c} CH_2CH_2OCOCH_3 \\ / \\ \\ \backslash \\ CH_2CH_2OCOCH_3 \end{array}$$

and $R_2$ are members selected from the group consisting of lower alkyl, chloro-lower alkyl and phenyl, and $R_3$ is a member selected from the group consisting of hydrogen and methyl.

2. A dyed product of claim 1 in which X and X′ are hydrogen, Y and Y′ are hydrogen, $R_1$ and $R_2$ are methyl and $R_3$ is hydrogen.

3. A dyed product of claim 1 in which X is nitro, X′ is hydrogen, Y and Y' are hydrogen, $R_1$ and $R_2$ are methyl and $R_3$ is hydrogen.

4. A dyed product of claim 1 in which X is N,N-dimethylsulfamyl, X' is hydrogen, Y and Y' are hydrogen, $R_1$ and $R_2$ are methyl and $R_3$ is hydrogen.

5. A dyed product of claim 1 in which X is chloro, X' is carbamyl, Y and Y' are hydrogen, $R_1$ and $R_2$ are methyl and $R_3$ is hydrogen.

6. A dyed product of claim 1 in which X is methoxy, X' is hydrogen, Y is methoxy and Y' is hydrogen, $R_1$ and $R_2$ are methyl and $R_3$ is hydrogen.

References Cited

UNITED STATES PATENTS 2,216,446  10/1940  McNally et al. _____ 8—48

DONALD LEVY, Primary Examiner

P. C. IVES, Assistant Examiner

U.S. Cl. X.R.

260—207; 8—48